US011277242B2

(12) United States Patent
Lunttila et al.

(10) Patent No.: US 11,277,242 B2
(45) Date of Patent: Mar. 15, 2022

(54) REFERENCE SIGNAL TRANSMISSION FROM MULTIPLE CELLS IN DORMANT MODE

(71) Applicant: Nokia Solutions and Networks Oy, Espoo (FI)

(72) Inventors: Timo Erkki Lunttila, Espoo (FI); Claudio Rosa, Randers (DK); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/761,761

(22) PCT Filed: Jan. 18, 2013

(86) PCT No.: PCT/EP2013/050942
§ 371 (c)(1),
(2) Date: Jul. 17, 2015

(87) PCT Pub. No.: WO2014/111155
PCT Pub. Date: Jul. 24, 2014

(65) Prior Publication Data
US 2015/0365201 A1 Dec. 17, 2015

(51) Int. Cl.
*H04L 5/00* (2006.01)
*H04W 72/04* (2009.01)

(52) U.S. Cl.
CPC ............ *H04L 5/005* (2013.01); *H04L 5/0069* (2013.01); *H04W 72/0446* (2013.01); *H04L 5/0007* (2013.01); *H04L 5/0073* (2013.01)

(58) Field of Classification Search
CPC ..... H04L 5/005; H04L 5/0069; H04L 5/0007; H04L 5/0073; H04W 72/0446
See application file for complete search history.

(56) References Cited

U.S. PATENT DOCUMENTS

| 9,474,089 | B2 * | 10/2016 | Wei | H04L 5/0098 |
| 9,641,306 | B2 * | 5/2017 | Seo | H04L 5/0055 |
| 10,728,835 | B2 * | 7/2020 | Tavildar | H04W 8/005 |
| 2010/0034127 | A1 * | 2/2010 | Iwamura | H04W 52/0225 370/311 |

(Continued)

FOREIGN PATENT DOCUMENTS

| CN | 102282899 A | 12/2011 |
| CN | 102549447 A | 7/2012 |

(Continued)

OTHER PUBLICATIONS

New WI proposal: New Carrier Type for LTE, Sep. 7, 2012, 3GPP TSG-RAN Meeting#57 (Year: 2012).*

(Continued)

*Primary Examiner* — Tejis Daya
(74) *Attorney, Agent, or Firm* — Harrington & Smith (57) ABSTRACT

A method includes receiving at least one reference signal from a first cell in a less active state and at least one reference signal from a second cell in a less active state within a same or different sub frames of a set of sub frames, wherein said at least one reference signal from the first base station is associated with different resource elements of said set of sub frames to those associated with the at least one reference signal from the second cell.

16 Claims, 7 Drawing Sheets

(56) References Cited

U.S. PATENT DOCUMENTS

| | | | | |
|---|---|---|---|---|
| 2010/0290389 | A1* | 11/2010 | Hou | H04W 48/12 370/328 |
| 2010/0317343 | A1* | 12/2010 | Krishnamurthy | G01S 1/30 455/435.1 |
| 2011/0032838 | A1* | 2/2011 | Liu | H04L 5/0032 370/252 |
| 2011/0039583 | A1* | 2/2011 | Frank | G01S 5/0226 455/456.5 |
| 2011/0081933 | A1* | 4/2011 | Suh | G01S 5/0236 455/509 |
| 2011/0122823 | A1* | 5/2011 | Chen | H04W 24/10 370/328 |
| 2011/0149868 | A1* | 6/2011 | Krishnamurthy | H04L 5/0007 370/328 |
| 2011/0286423 | A1* | 11/2011 | Berggren | H04L 5/001 370/329 |
| 2012/0002740 | A1* | 1/2012 | Han | H04L 5/0048 375/260 |
| 2012/0015657 | A1* | 1/2012 | Comsa | H04W 36/0094 455/436 |
| 2012/0040696 | A1* | 2/2012 | Siomina | H04L 5/0062 455/456.6 |
| 2012/0087261 | A1* | 4/2012 | Yoo | H04L 25/03 370/252 |
| 2012/0094661 | A1* | 4/2012 | Frenger | H04W 52/343 455/434 |
| 2012/0099547 | A1* | 4/2012 | Wan | H04B 7/024 370/329 |
| 2012/0106349 | A1* | 5/2012 | Adjakple | H04W 52/0206 370/241 |
| 2012/0184290 | A1* | 7/2012 | Kazmi | G01S 5/10 455/456.1 |
| 2012/0208523 | A1* | 8/2012 | Hans | H04W 64/00 455/422.1 |
| 2012/0243500 | A1* | 9/2012 | Chandrasekhar | H04W 72/02 370/330 |
| 2013/0012202 | A1* | 1/2013 | Lindoff | H04W 48/16 455/434 |
| 2013/0040673 | A1* | 2/2013 | Siomina | G01S 5/0226 455/501 |
| 2013/0121188 | A1* | 5/2013 | Das | H04W 56/00 370/252 |
| 2013/0195034 | A1* | 8/2013 | Noh | H04L 5/0053 370/329 |
| 2013/0230013 | A1* | 9/2013 | Seo | H04L 27/2602 370/329 |
| 2014/0086208 | A1* | 3/2014 | Murray | H04W 36/0072 370/331 |
| 2014/0126438 | A1* | 5/2014 | Zhu | H04J 11/0093 370/311 |
| 2015/0305024 | A1* | 10/2015 | Rosa | H04W 56/00 370/329 |
| 2015/0319624 | A1* | 11/2015 | Garcia | H04W 8/26 370/329 |
| 2015/0358094 | A1* | 12/2015 | Yi | H04W 72/08 370/252 |
| 2016/0007406 | A1* | 1/2016 | Yi | H04W 24/02 370/252 |

FOREIGN PATENT DOCUMENTS

| | | | | |
|---|---|---|---|---|
| JP | | 2012-518327 A | 8/2012 | |
| WO | | WO-2010/121435 A1 | 10/2010 | |
| WO | | WO-2011/022129 A1 | 2/2011 | |
| WO | | WO-2011162112 A1 * | 12/2011 | H04L 5/005 |

OTHER PUBLICATIONS

3GPP TSG RAN WG1 #59bis, Valencia, Spain, Jan. 18-22, 2010, R1-100144, "Considerations on Extended Cell DTX", Samsung, 5 pgs.

Alcatel-Lucent et al: "Way Forward on Rel-11 completion in RAN1"; RP-120856; 3GPP TSG-RAN Meeting #56; Ljubljana, Slovenia, Jun. 13-15, 2012; pp. 1-2; 3rd Generation Partnership Project (3GPP); Mobile Competence Centre; 650, Route des Lucioles; F-06921 Sophia-Antipolis Cedex; France.

* cited by examiner

REFERENCE SIGNAL TRANSMISSION FROM MULTIPLE CELLS IN DORMANT MODE

TECHNICAL FIELD

This disclosure relates to methods and apparatus and in particular but not exclusively to methods and apparatus for use where a cell or network node has a lower activity mode.

BACKGROUND

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

BRIEF SUMMARY OF THE INVENTION

According to an aspect, there is provided a method comprising: receiving at least one reference signal from a first cell in a less active state and at least one reference signal from a second cell in a less active state within a same or different sub frames of a set of sub frames, wherein said at least one reference signal from the first base station is associated with different resource elements of said set of sub frames to those associated with the at least one reference signal from the second cell.

Each cell may have an identity associated therewith, a position of at least one reference signal from a respective cell being dependent on said cell identity.

According to an aspect, there is provided a method comprising: receiving at least one reference signal from a first cell in a less active state a position of said reference signal being dependent on an identity of said cell.

According to an aspect there is provided a method comprising: causing at least one reference signal to be transmitted from a first cell, said first cell being in a less active state, a position of said reference signal being dependent on an identity of said cell.

The at least one reference signal of said first cell may be provided in a sub frame of a set of sub frames, and is provided on different resource elements of said set of sub frames to those used by a second cell.

It should be appreciated that any or more of the following features may be used in conjunction with any one or more of the above aspects.

The position may be dependent on a modulo operation performed with respect to said cell identity.

The modulo operation may be dependent on a number of positions available in said set of sub frames for use by different cells for their respective at least one reference signal.

At least one of reference signals may comprise a reference signal provided over two adjacent symbols of a same sub frame.

Each at least one reference signal may comprise a synchronization signal.

The synchronisation signal may comprise a primary and/or secondary synchronisation signal.

At least one reference signal may comprise a reference signal which is provided using p resource elements of at least one symbol, each symbol having q having resource elements, p being less than q.

The at least one reference signal may be provided using a plurality of resource elements of at least two different symbols, at least two of said resource elements being at different subcarriers.

The symbols may comprise orthogonal frequency division multiplexing symbols Each at least one reference signal may comprise a common reference signal.

The set may comprise a plurality of consecutive sub frames.

The set of frames may be repeated x times to provide a burst, x being an integer.

According to another aspect, there is provided a reference signal transmitted from a first cell, said first cell being in a less active state, a position of said reference signal in a sub frame being dependent on an identity of said cell.

According to another aspect, there is provided an apparatus comprising; means for receiving at least one reference signal from a first cell in a less active state and at least one reference signal from a second cell in a less active state within a same or different sub frames of a set of sub frames, wherein said at least one reference signal from the first base station is associated with different resource elements of said set of sub frames to those associated with the at least one reference signal from the second cell.

Each cell may have an identity associated therewith, a position of at least one reference signal from a respective cell being dependent on said cell identity.

The apparatus may be provided in a user equipment.

According to an aspect, there is provided an apparatus comprising; means for receiving at least one reference signal from a first cell in a less active state a position of said reference signal being dependent on an identity of said cell.

The apparatus may be provided in a user equipment.

According to an aspect there is provided an apparatus comprising: means for causing at least one reference signal to be transmitted from a first cell, said first cell being in a less active state, a position of said reference signal being dependent on an identity of said cell.

The at least one reference signal of said first cell may be provided in a sub frame of a set of sub frames, and is provided on different resource elements of said set of sub frames to those used by a second cell.

The apparatus may be provided in a cell or a base station

It should be appreciated that any or more of the following features may be used in conjunction with any one or more of the above aspects.

The position may be dependent on a modulo operation performed with respect to said cell identity.

The modulo operation may be dependent on a number of positions available in said set of sub frames for use by different cells for their respective at least one reference signal.

At least one of reference signals may comprise a reference signal provided over two adjacent symbols of a same sub frame.

Each at least one reference signal may comprise a synchronization signal.

The synchronisation signal may comprise a primary and/or secondary synchronisation signal.

At least one reference signal may comprise a reference signal which is provided using p resource elements of at least one symbol, each symbol having q having resource elements, p being less than q.

The at least one reference signal may be provided using a plurality of resource elements of at least two different symbols, at least two of said resource elements being at different subcarriers.

The symbols may comprise orthogonal frequency division multiplexing symbols

Each at least one reference signal may comprise a common reference signal.

The set may comprise a plurality of consecutive sub frames.

The set of frames may be repeated x times to provide a burst, x being an integer.

According to another aspect, there is provided an apparatus comprising at least one processor and at least one memory comprising computer code for one or more programs, the computer code configured, with the at least one processor, to cause the apparatus at least to: receive at least one reference signal from a first cell in a less active state and at least one reference signal from a second cell in a less active state within a same or different sub frames of a set of sub frames, wherein said at least one reference signal from the first base station is associated with different resource elements of said set of sub frames to those associated with the at least one reference signal from the second cell.

Each cell may have an identity associated therewith, a position of at least one reference signal from a respective cell being dependent on said cell identity.

The apparatus may be provided in a user equipment.

According to another aspect, there is provided an apparatus comprising at least one processor and at least one memory comprising computer code for one or more programs, the computer code configured, with the at least one processor, to cause the apparatus at least to: receive at least one reference signal from a first cell in a less active state a position of said reference signal being dependent on an identity of said cell.

The apparatus may be provided in a user equipment.

According to another aspect, there is provided an apparatus comprising at least one processor and at least one memory comprising computer code for one or more programs, the computer code configured, with the at least one processor, to cause the apparatus at least to: cause at least one reference signal to be transmitted from a first cell, said first cell being in a less active state, a position of said reference signal being dependent on an identity of said cell.

The at least one reference signal of said first cell may be provided in a sub frame of a set of sub frames, and is provided on different resource elements of said set of sub frames to those used by a second cell.

The apparatus may be provided in a cell or a base station.

It should be appreciated that any or more of the following features may be used in conjunction with any one or more of the above aspects.

The position may be dependent on a modulo operation performed with respect to said cell identity.

The modulo operation may be dependent on a number of positions available in said set of sub frames for use by different cells for their respective at least one reference signal.

At least one of reference signals may comprise a reference signal provided over two adjacent symbols of a same sub frame.

Each at least one reference signal may comprise a synchronization signal.

The synchronisation signal may comprise a primary and/or secondary synchronisation signal.

At least one reference signal may comprise a reference signal which is provided using p resource elements of at least one symbol, each symbol having q having resource elements, p being less than q.

The at least one reference signal may be provided using a plurality of resource elements of at least two different symbols, at least two of said resource elements being at different subcarriers.

The symbols may comprise orthogonal frequency division multiplexing symbols

Each at least one reference signal may comprise a common reference signal.

The set may comprise a plurality of consecutive sub frames.

The set of frames may be repeated x times to provide a burst, x being an integer.

Any of the methods above may be performed by an apparatus. The apparatus may be provided in a user equipment, a cell apparatus or an apparatus of a base station.

A computer program comprising program code means adapted to perform the method may also be provided. The computer program may be stored and/or otherwise embodied by means of a carrier medium.

It should be appreciated that any feature of any aspect may be combined with any other feature of any other aspect.

BRIEF DESCRIPTION OF DRAWINGS

Embodiments will now be described in further detail, by way of example only, with reference to the following examples and accompanying drawings, in which.

DETAILED DESCRIPTION

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
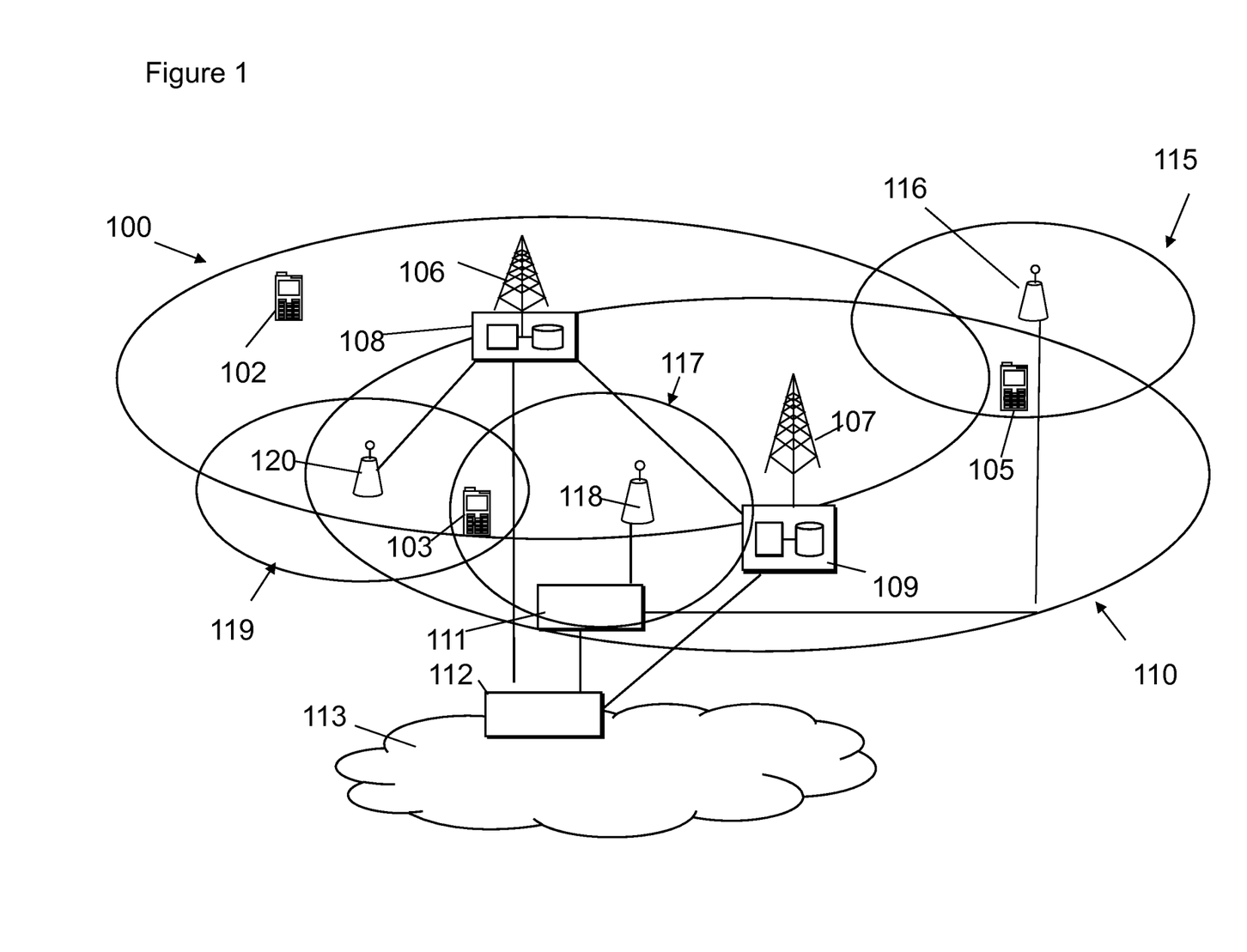
FIG. 1 shows a schematic diagram of a communication system comprising a base station and a plurality of communication devices.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided.

Figure 2:
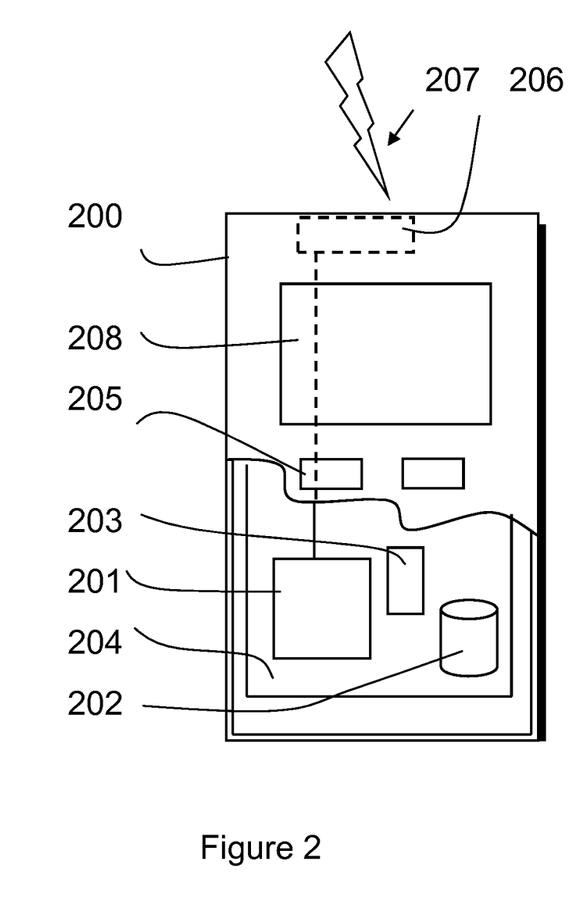
FIG. 2 shows a schematic diagram of a mobile communication device according to some embodiments.

A possible mobile communication device will now be described in more detail with reference to FIG. 2 showing a schematic, partially sectioned view of a communication device 200. This may be any of the communication devices 102, 103 and 105 of FIG. 1. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with TX antenna numbers or port numbers of MIMO arrangements.

A mobile device 200 is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
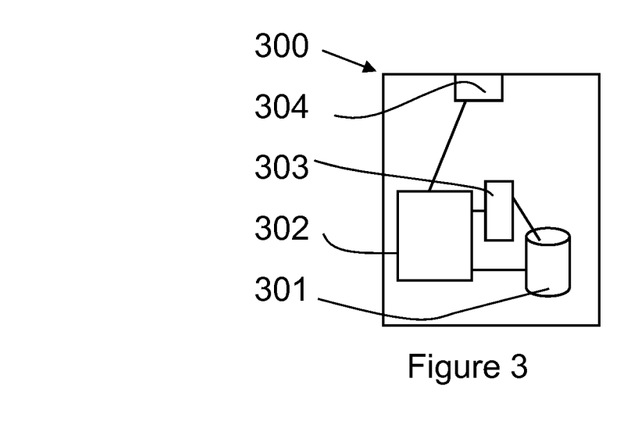
FIG. 3 shows a schematic diagram of a control apparatus according to some embodiments.

FIG. 3 shows an example of a control apparatus for a communication system, for example to be coupled to and/or for controlling a station of an access system, such as a base station. In some embodiments, base stations comprise a separate control apparatus. In other embodiments, the control apparatus can be another network element such as a radio network controller. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

As part 3GPP Release 12 a work item on NCT (new carrier type) has been proposed and agreed. The carrier may be used in such a way in order to achieve one or more of the following aims: network energy-saving; overhead reduction; and enhanced support for arrangements which include one or more smaller cell at least partially overlying a larger cell. Some arrangements where one or more smaller cells overlie a larger cell (for example a macro cell) are sometimes referred to as HetNet arrangements.

To allow for network energy savings, a base station may be controlled to allow for completely blank subframes when there is no data to transmit. This means that the transmitter can be at least partially shut down.

An overhead reduction may be achieved by reducing the CRS (common reference signal) overhead in situations where the DM RS (demodulation reference signal) may be used. The overhead reduction may be particularly advantageous in beam forming MIMO (multiple input multiple output) operation with, for example four or more antennas. In situations such as the HetNet scenario outlined above, there may be reduced interference from common signals.

Some embodiments may provide base stations which support a dual dormant/active state. This may mean DTX (discontinuous transmission) like base station behaviour, with for example relatively long DTX cycles. The UE may perform procedures to take into account the state of the base station. In some embodiments there may be a reduced CRS in the active state.

Some embodiments may allow for base station energy saving, utilising the dormancy operation. Signals may be provided to allow for neighbour cell discovery and RRM (radio resource management) measurements.

In some embodiments, energy efficiency may be achieved by scheduling transmissions in as few DL subframes as possible. In this way the rest of the subframes may be kept empty ("blank") and the transmitter of the eNodeB can be shut down in those subframes to save energy.

Some embodiments relate to the use of the eNodeB (eNB) dormancy feature of a carrier for example in the context of small cells. By way of example a small cell may be a pico cell, a HetNet cell or the like.

However, even though a cell/carrier is not carrying any traffic, common signals and channels such as one or more of PDCCH (Physical Downlink Control Channel), PHICH (Physical Hybrid ARQ (Automatic Repeat-reQuest) Indicator Channel), PCFICH (Physical Control Format Indicator Channel), PSS/SSS (Primary Synchronization Signal/Secondary Synchronization Signal), PCH (Paging Channel), PBCH (Physical Broadcast Channel), SIB (system information block), CRS (Common (cell specific) Reference Signal) and CSIRS (Channel State Information Reference Signal) may be required, for example, in order to support mobility.

In some embodiments, to achieve energy savings, it is desirable to avoid the need to transmit common (cell specific) signals when that is not required. Instead of transmitting common channels and signals such as CRS, PDCCH, PHICH, PCFICH in every subframe, a duty cycle is provided. By way of example only the duty cycle may be 5 ms. However, in other embodiments, different duty cycles may be used. The different duty cycles may be greater or smaller than 5 ms. Where the duty cycle is 5 ms, this would result in having the common signals present in only every 5th subframe. During low network load this would allow for the eNodeB to e.g. ramp down at least some of the transmitter functionality (e.g. power amplifier) to save energy and reduce interference.

Alternatively, an eNodeB dormancy/DTX (discontinuous transmission) type operation may be provided. In this alternative, the network would suspend the transmission of all common signals and channels for a much larger period of time than say 5 ms.

It should be appreciated that in some embodiments, the eNodeB or base station dormancy operation could be applied to a carrier having all common signals present, or a carrier having reduced common signals. The carrier having all common signals present may be a so called legacy carrier. The carrier having reduced common signals may be a so called new carrier type.

Figure 4:
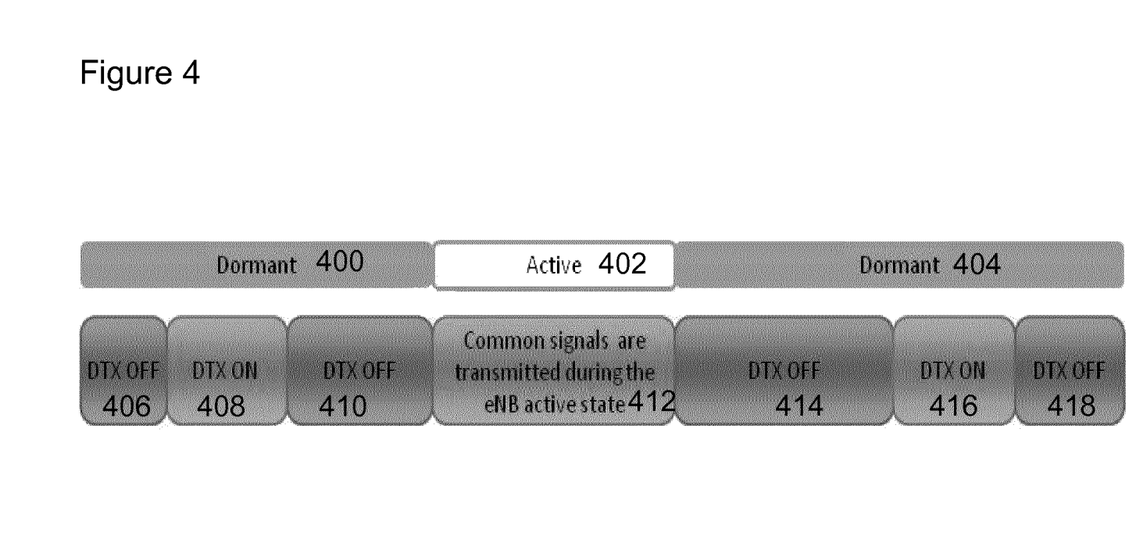
FIG. 4 shows schematically an active states and dormant states of a base station.

Reference is made to FIG. 4 which shows schematically the operation of a base station which has dormant and active states. In particular, in the arrangement of FIG. 4, the base station has a first dormant state 400, followed by an active state 402 followed by another dormant state 404. During the first dormant state 400, there is a first DTX off period 406 followed by the DTX on period 408 followed by a second DTX off period 410. When the base station is in the DTX off periods, the base station generally transmits nothing. When the base station is in the DTX on state, there will be some signals transmitted for example to allow the discovery of neighbouring cells and/or for example to allow for RRM measurements necessary for cell selection.

During the active state 402, the state 412 is such that common signals are transmitted during this active state. In other words, the base station operates as normal, transmitting signals to user equipment. In the second dormant state 404, again there is a first DTX off state 414 followed by a DTX on state 416 followed by a DTX off state 418. The DTX on state may last in some embodiments for a relatively large number of sub frames and may for example last for more than 10 sub frames.

In some embodiments, from the UE and/or the network point of view it may be advantageous to align the DTX ON periods of neighboring cells. For a UE, having the DTX ON periods of two or more cells aligned and synchronized allows for discovering two or more cells during a relatively short period of time. This may minimize the UE energy consumption. This may alternatively or additionally impact on data throughput as the UE may not be able to transmit/receive data while performing neighbor cell measurements. Generally so called "measurement gaps" are configured.

From the perspective of the network, having the UEs measure as many neighboring cells at the same time as possible may minimize the disruptions to data transmissions due to measurement gaps. In other words, the number and/or duration of measurement gaps may be reduced.

Some embodiments may provide signaling and/or configuration options for discovery or reference signals and/or the multiplexing of such signals among different cells or transmission points during the DTX ON period of a dormant base station state.

In some embodiments, the transmission of synchronization and/or reference signals is carried out to enable a fast and/or efficient cell search.

In some embodiments, DTX ON Discovery signals (DOD) may be defined as, for example, reference signals transmitted in a given period. The DOD may be defined as the signals which are transmitted when the base station is in a dormant mode but some transmitting some basic signals. These basic signals may be reference signals. The reference signals may be a combination of PSS/SSS and CRS. The given period may be one sub frame. In other embodiments, the given period may be longer than a sub frame. A DOD signal may be provided in a single sub frame or may be provided by a burst which is transmitted over two or more sub frames. In some embodiments, the DOD signal of a given base station may be repeated in a number of sub frames. In some embodiments the sub frames in which DOD signal is transmitted are non-consecutive.

In some embodiments, the components of DOD signals may be based on the signals present already in the existing LTE standards, namely PSS/SSS and CRS. In order to provide orthogonality for the DOD signals, the PSS/SSS and CRS time and/or frequency positions within a sub frame (i.e. resource elements) can vary deterministically between the cells.

The DOD configuration (i.e. combination of PSS/SSS and CRS positions) may be derived for example based on the physical cell ID and modulo operation. An example will be given later.

Presently there are 504 physical cell Ids (PCI) defined. Of course this may be different in different standards and different versions of this standard. As outlined below there are in some embodiments 20 unique (orthogonal) positions for DOD signals indexed e.g. 0 . . . 19. The index of the positions for DOD signal is given by: DOD index =PCI Modulo 20

It should be appreciated that the index can be generalized to one of x different options where x is the number of unique positions in the duty cycle. X will be an integer. The index can thus be generalized to DOD index =PCI Modulo x.

Alternatively or additionally, the position may be signaled. This may be signaled using for example dedicated RRC (radio resource control) signaling when the corresponding measurement object is configured (in a similar way as different measurement patterns for different cell ID groups can be configured in Rel-8). At the time when the network configures the UE to perform measurements on a given frequency carrier, the network may provide also information related to e.g. reference signal configuration. This reference signal information would indicate in which sub frame or sub frames and/or at which frequency or frequencies the UE should look for reference signals from base stations or cells which are in an inactive mode.

In some embodiments, the DOD signals for different cells can be transmitted in different predetermined sub frames.

The DOD signals for a given cell may be transmitted in burst of for example 2-10 sub frames. It should be appreciated in some embodiments, the number of sub frames may be one or in some cases more than 10. The sub frames may be consecutive or non-consecutive sub frames or a mixture of consecutive and non-consecutive. The DOD signal may be considered to be a whole burst, consisting of CRS/PSS/SSS repeated y times in every Nth sub frame. In alternative embodiments, the DOD signal may alternatively be considered to be the reference signal or signals transmitted by a given cell in a one sub frame.

In some embodiments, the duty cycle of DOD signals within the burst may be 5 ms which means that the duty cycle is aligned with the duty cycle of the so called new carrier type. However in other embodiments the duty cycle may be more or less than 5 ms. A DOD signal may be repeated every 5 ms. The burst may alternatively or additionally be defined in terms of numbers of sub frames.

In some embodiments there is an information exchange between eNBs. This exchange of information is used to ensure that the eNBs within range of each other have coordinated their respective configurations. This information exchange may be via wired and/or wireless interfaces. One example of an interface is the X2 interface. Information may alternatively or additionally be provided through a wireless exchange where the eNBs communicates over an air interface. The information exchange may be based on an implementation of a network listen mode (NLM) where a new eNB listens for the configurations of current neighbors and adapts to those configurations to minimize any impact on their respective configurations.

Alternatively or additionally, a controller may control the base stations to ensure their respective configurations are coordinated. The signaling may be provided to one or more of the base stations by the controller. The controller may be an entity such as radio network controller or the like.

In this way, each base station will know when it is supposed to transmit its DOD and that will be a time different to another base station. In some embodiments, more than one different base station will transmit their DOD in the same sub frame using the same PRB but using for example different symbols and/or subcarriers.

The PSS/SSS for a given base station in LTE may be transmitted twice in every radio frame, in sub frames #0 and #5. This may be used with the so called new carrier type. Some embodiments may follow this pattern. However, other embodiments may use different patterns.

Considering one embodiment for DOD signals, taking FDD (frequency division duplexing) and normal CP (cyclic prefix) as an example, the following orthogonal time positions within the same sub frame may be available in some embodiments:

OFDMA symbol pairs {1, 2}, {2, 3}, {5, 6}, {8, 9}, {9, 10}, {12, 13}

The symbol pairs are used to transmit the PSS/SSS signal. It should be appreciated that in other embodiments, one or more different symbol pairs may be available. It should be appreciated that alternatively, the PSS/SSS may be transmitted by non-adjacent symbols.

Whilst some of the pairs are mutually exclusive, four unique pairs can be easily found (e.g. {1, 2}, {5, 6}, {8, 9}, {12, 13}). With a duty cycle of 5 sub frames, it is possible to multiplex altogether 4×5=20 PSS/SSS fully orthogonal sequences into a single radio frame. In other words up to 20 different base stations can be supported. Put another way, each frame of the 5 sub frames could support four different base stations in a dormant DTX ON mode. After that, the pattern may be repeated. Further multiplexing capacity may be obtained by utilizing different frequency resources (i.e. PRB (physical resource blocks) for PSS/SSS transmission. In other words, if additional physical resource blocks are used for the PSS/SSS transmission, then each sub frame of each PRB could support four different base stations.

The CRS-component of DOD-signal may be for frequency and/or time tracking purposes. The component may be a single CRS port transmitted with a 5 ms duty cycle. Orthogonality may be obtained in one or more of the following ways:

Different CRS frequency shifts can be utilized: LTE Rel-8 for example supports six different subcarrier positions for CRS.

Different CRS ports can be utilized: the Res (resource elements) corresponding to CRS ports 0 or 1 can be used. However, if all 6 frequency shifts are in use, this may not provide further orthogonality.

Shifting CRS positions in time: similarly as with PSS/SSS assuming 5 sub frame duty cycle for CRS, interleaving the transmissions of CRS corresponding to different cells' DODs. In combination with CRS frequency shifting this provides altogether 6×5=30 unique time-frequency resources for DOD signal. Each sub frame is able to support 6 different base stations. A duty cycle of 5 sub frames would mean that 30 base stations could be supported. Of course, only 4 base stations need to be supported in one sub frame in some embodiments as the PSS/SSS requirements mean only four base stations may be supported in one sub frame.

It should be appreciated that in some embodiments, the PSS/SSS and CRS for a given base station will be provided in the same sub frame.

Figure 5:
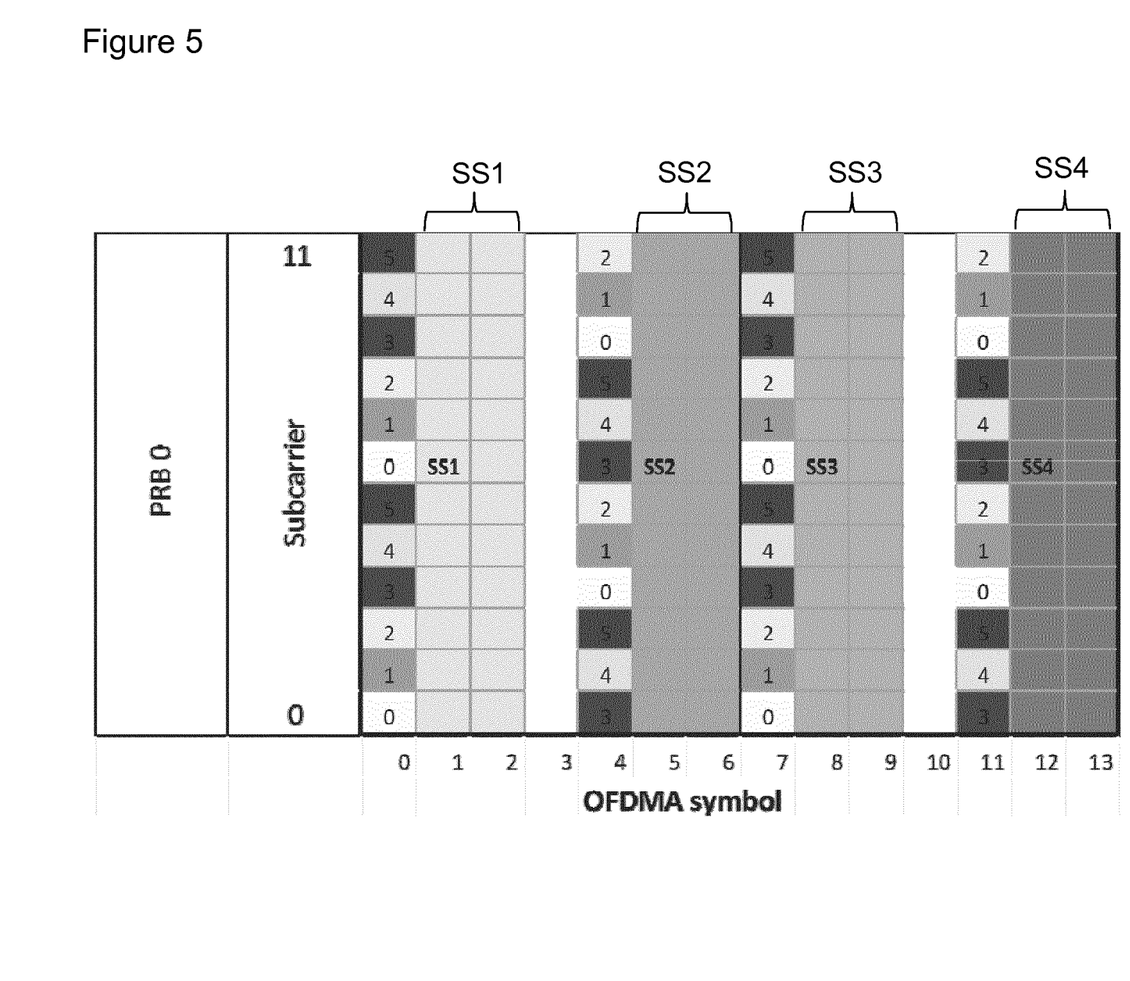
FIG. 5 shows a physical resource block as might be received by a user equipment.

Reference is now made to FIG. 5 shows the multiplexing principle according to one embodiment. FIG. 5 illustrates a signal which might be received by a UE. Here only one PRB pair is shown. In for example 3GPP, a PRB pair has a duration of 1 ms, and has 12 subcarriers. A PRB consists of two 0.5 ms slots, and technically a PRB is 12 subcarriers *0.5 ms. The physical resource block pair is made up of 14 symbols. Each symbol is made up of 12 resource elements, each resource element of a symbol is associated with a different subcarrier. As discussed above, it is possible to provide four fully orthogonal time-frequency resources for a DOD signal consisting of PSS/SSS and CRS. Furthermore, adding e.g. 5 ms sub frame level duty cycle on top, the capacity is further increased. In the arrangement of FIG. 5, four symbol pairs provide a respective PSS/SSS signal referenced SS1, SS2, SS3 and SS4. Each of the symbol pairs is provided for each of the 12 subcarriers. Each symbol pair provides the PSS/SSS signal for a respective different base station. The CRS signals are provided in symbols 0, 4, 7 and 9. Each of these symbols provides part of the CRS signal for up to 6 different base stations. Different ones of the subcarriers of a symbol are used for the CRS signal from different base stations. For example, subcarrier 0 and 6 in symbol 0 and 7, and subcarrier 3 and 9 in symbol 4 and 11 provide the CRS signal for a first base station. Subcarrier 1 and 7 in symbol 0 and 7, and subcarrier 4 and 10 in symbol 4 and 11 provide the CRS signal for a second base station and so on.

In some embodiments, by combining PSS/SSS and CRS such as previously described, some embodiments may have one or more of the following advantages: A plurality of fully orthogonal discovery signals may be constructed (up to 20 without including PSS/SSS frequency offset in some embodiments);

Usage of existing implementations;

Commonality at least partially with Rel-11 type of NCT design; and

By having coordination between eNBs, it may possible to achieve coordinated muting of transmissions in the affected PRB pairs to create situations with lower inter-cell interference for more accurate estimation of the path loss to the neighbors.

The PSS/SSS sequences define the physical cell id (one of 504 alternatives). Additionally, modulo operation binds the physical Cell ID to the DOD signal positions. In this way the UE will know which reference signals are associated with which base stations or cells. It should be appreciated that the CRS position may be tied to the associated position of the PSS/SSS sequences.

Figure 6:
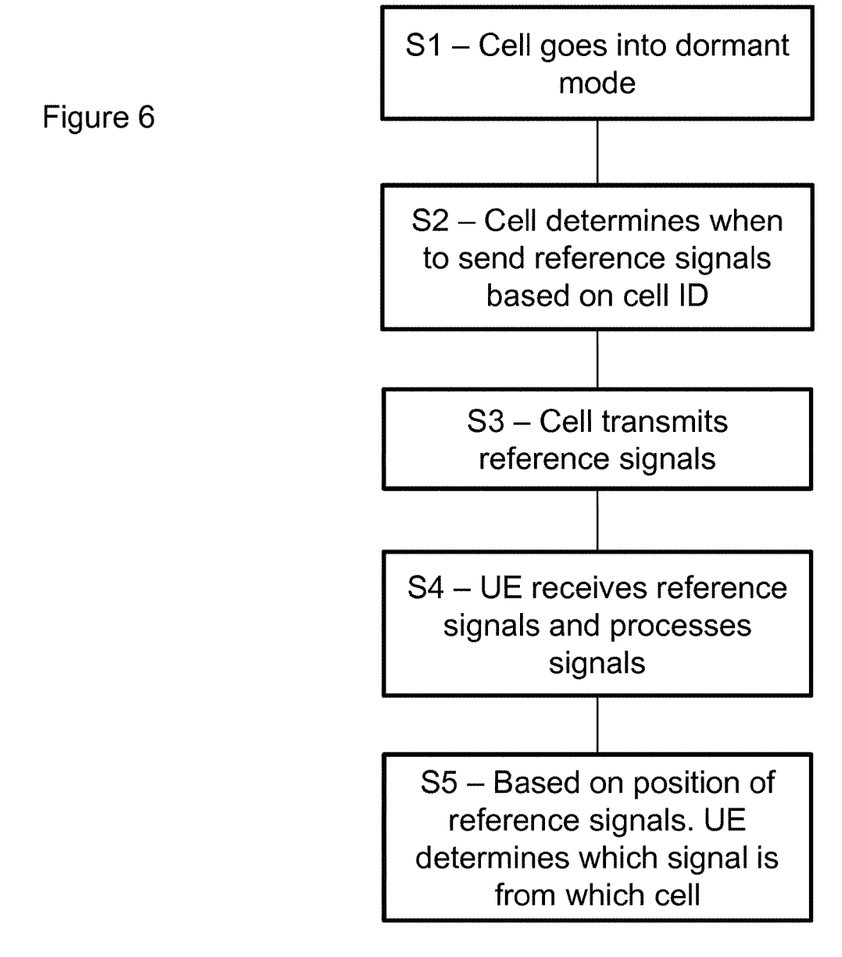
FIG. 6 shows a method of an embodiment.

Reference is made to FIG. 6 which shows a method of an embodiment. In step S1, a cell goes into a less active or dormant mode. This may be controlled by the cell itself and/or by a controller such as a radio network controller.

In step S2, the cell determines the timing for the reference signals. In particular, the cell determines when and on which resources to send the reference signals. In one embodiment, the timing for the reference signal will be based on the cell ID.

In step S3, the cell transmits the reference signals. The timing of the reference signals will be controlled by the cell in dependence on for example the cell ID.

In step S4, a user equipment receives the reference signals and processes the signals. In practice, the user equipment may receive reference signals from more than one base station. The reference signals may be orthogonal. In some embodiments, this may mean that the reference signals received at different times. In some embodiments, the reference signals from two different base stations may be received within the same sub frame. In alternative embodiments, reference signals from different cells may be received in different sub frames. Of course, in some embodiments, a user equipment may receive reference signals from three or more base stations. It is possible that some reference signals from different base stations may be in different sub frames and/or different reference signals from different base stations may be received in the same sub frame.

In step S5, based on the position of the reference signals, the user equipment is able to determine from which cell the signal has been transmitted. These reference signals are used by the user equipment for discovery purposes.

Figure 7:
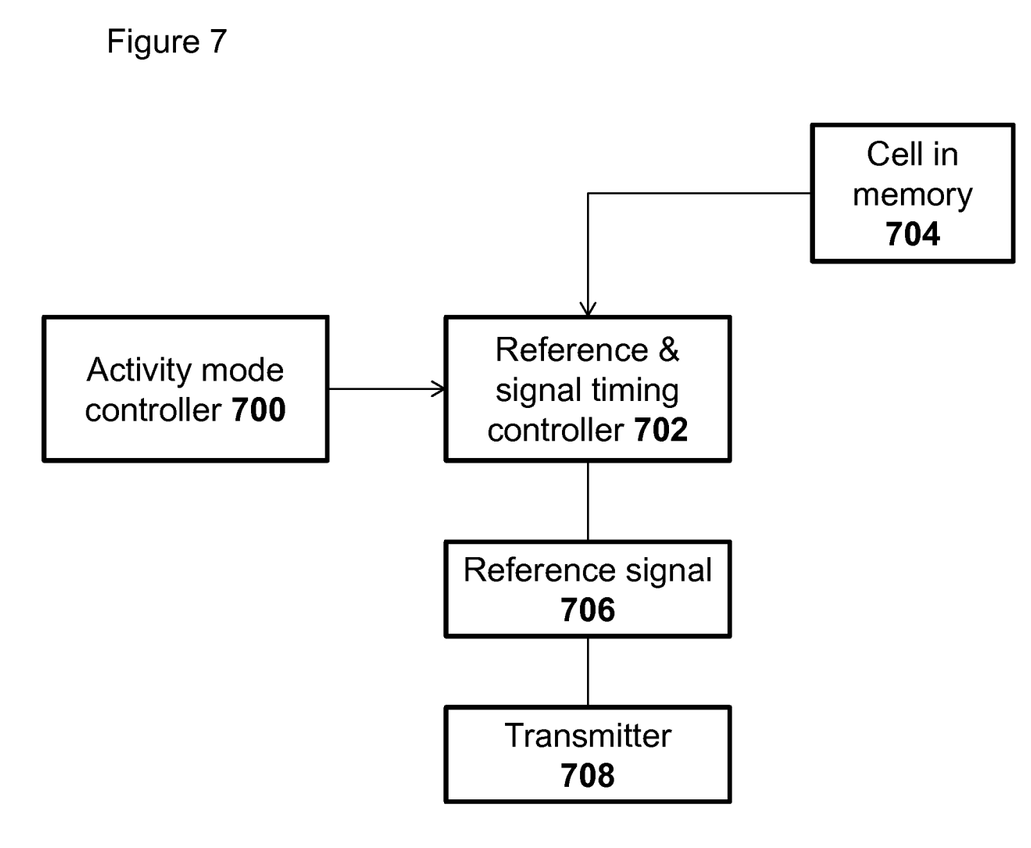
FIG. 7 schematically shows an apparatus of a cell.

Reference is made to FIG. 7 which schematically shows an apparatus of a cell. The apparatus comprises an activity mode controller 700. The activity mode controller will control whether the cell is in an active or dormant mode. This may be in response to information determined by the cell itself and/or information received for example from a radio network controller. The activity mode controller 700 is configured to provide information to a reference signal timing controller 702. They reference signal timing controller 702 is arranged so that in a dormant mode, the cell ID is used to control the timing of the reference signals, that is when and on which resources a reference signal is to be transmitted. The cell ID may be stored in memory 704.

The reference signal timing controller 702 is configured to provide timing information to a reference signal block 706. This provides the reference signal with timing information to a transmitter 708 which transmits the reference signal with the required timing.

Figure 8:
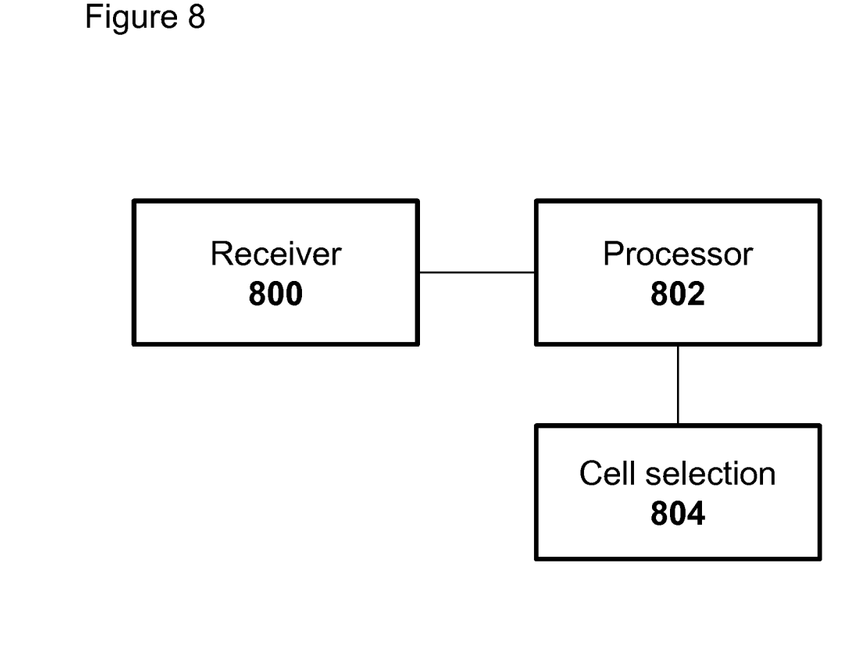
FIG. 8 schematically shows an apparatus of an UE.

Reference is now made to FIG. 8 which schematically shows an apparatus of a user equipment. The apparatus comprises a receiver 800 which is arranged to receive reference signals from one or more cells. A processor 802 is configured to process the reference signals and may determine from which cell a respective reference signal has been received. This may be determined from the cell ID. This information may be provided to a cell selection block 804 which may use information in making cell selection and hand-over decisions.

It should be appreciated that one or more of the blocks shown in FIG. 7 or 8 may be provided by at least one processor and/or at least one memory. Different functions may be provided by the same or different processors and/or memories. It should be appreciated that in alternative embodiments, one or more of the blocks shown in FIG. 7 or 8 of may be provided by suitable circuitry and/or hardware arrangement.

DTX mode is one example of an inactive or lower activity mode. Alternative embodiments may be used with any other suitable inactive or lower activity mode. The dormant state may be a state where one or more components of a base station may be turned off, put into a standby state or not used. In one embodiment, a dormant state may be one where no signals are transmitted other than one or more reference signals. The dormant state may consume less power than an active state.

It should be appreciated that where a base station supports more than one carrier option, one or more of the carrier options may be put into a dormant state. In this alternative, one or more carrier options may be in an active state while one or more carrier options is in a dormant state.

The active state may in some embodiments be considered to a normal operation mode of a base station.

Reference has been made to cells, in some embodiments. In some embodiments, the teachings may alternatively applied by a network node. The network node may be a base station or the like.

In some embodiments, the user equipment may receive mode information indicating when a cell is in the less active or dormant mode. This information may be provided directly or indirectly. For example, the mode information may be provided when the state of the first cell changes to the less active mode. However, in some embodiments, the user equipment will assume that the cell is in the less active mode unless the user equipment receives information indicating that the use the cell is in the active mode. Of course, in some embodiments, the user equipment may receive information which indicates when the active mode starts and when the active mode ends.

Reference has been made to particular configurations. Some embodiments may be applied to other configurations.

Reference has been made to various channels. It should be appreciated that other embodiments may be used with other channels.

Reference has been made to the so called new carrier type. It should be appreciated that this may be referred to by alternative nomenclature in the future. It should be appreciated that other embodiments may alternatively or additionally be used with any other carriers.

It is noted that whilst embodiments have been described in relation to LTE, similar principles can be applied to any other communication system or to further developments with LTE. Therefore, although certain embodiments were described above by way of example with reference to certain exemplifying architectures for wireless networks, technologies and standards, embodiments may be applied to any other suitable forms of communication systems than those illustrated and described herein.

In the previously described embodiments, reference has been made to the reference signals PSS, SSS and CSR. One or more of these signals may be omitted. It should be appreciated that alternatively or additionally any other suitable reference signal may be used.

In some embodiments only one reference signal may be required. In other embodiments more than one reference signal may be required.

In the above, reference has been made to the reference signals of base stations. In some embodiments the reference signals may be provided by a cell, In some embodiments, a base station can provide one or more cells. In some embodiments, the resource elements of the PSS/SSS may be determined by the physical cell ID as previously described.

In some embodiments an association is provided between a) cell (cell ID), and b) resource elements on which the three reference signals (PSS/SSS/CRS) are transmitted.

In some embodiments, in addition to the resource elements within a PRB, the sub frame in which the reference signals are transmitted is associated with the cell (i.e. depends on the cell ID). In some embodiments reference signals from a first cell may be associated with first sub frame and a reference signal from a second cell within a second sub frame. Assuming a five sub frame duty cycle, there would be five possible different sub frames with which a given cell (cell ID) could be associated with.

In some embodiments PSS/SSS and CRS signals consisting of a burst (a predefined number of repetitions with a given duty cycle) is used for neighbour-cell discovery to achieve fast and efficient cell search during eNB's dormant state. If in the DTX ON mode, (where the eNB is in a sleep mode but is only transmitting PSS/SSS/CRS) a dormant type of downlink DL time period is defined for DL LTE. In this period only CRS and PSS/SSS are transmitted on the downlink to support a UE e.g. synchronization and network cell selection features during the dormant state.

In some embodiments, different cells transmit their PSS/SSS signals at different OFDM-symbols within a sub frame, thus guaranteeing the orthogonality of discovery between different cells. Moreover, further orthogonality is provided by introducing additional dependency between the cell ID and the timing of the PSS/SSS within the burst (both within sub frame as well as among different sub frames) and/or frequency shift of the CRS.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method, comprising:
receiving, by a network node, at least one discovery signal from a first cell in a less active state than another cell and receiving at least one discovery signal from a second cell in a less active state than the another cell within different sub frames of a set of sub frames, said set of sub frames comprising a plurality of consecutive sub frames, said second cell neighboring said first cell,
wherein a first sub frame in which the at least one discovery signal received from the first cell depends on a first cell identifier of the first cell, and a second sub frame in which the at least one discovery signal received from the second cell depends on a second cell identifier of the second cell,
wherein the at least one discovery signal from the first cell is associated with different resource elements of said set of sub frames to those associated with the at least one discovery signal from the second cell,
wherein each respective one of the first cell and the second cell is associated with a respective cell identity; and
deriving a number of positions of the at least one discovery signal from the respective one of the first cell and the second cell being dependent on said respective cell identity,
wherein the number of positions is derived based on a modulo operation performed with respect to said respective cell identity, and
wherein a period for receiving the at least one discovery signal from the first cell is aligned with a period for receiving the at least one discovery signal from the neighboring second cell.

2. A method comprising:
transmitting, by a base station of a first cell, at least one discovery signal from the first cell, said first cell being in a less active state than another cell,
wherein the at least one discovery signal is transmitted within a first sub frame that is different from a second sub frame used for transmitting at least one discovery signal by a second cell, a set of sub frames comprising the first sub frame and the second sub frame, said set of sub frames comprising a plurality of consecutive sub frames, said second cell neighboring said first cell, and said second cell being in a less active state than the another cell,
wherein the first sub frame in which the at least one discovery signal transmitted from the first cell depends on a first cell identifier of the first cell, and the second sub frame in which the at least one discovery signal transmitted from the second cell depends on a second cell identifier of the second cell,
wherein the at least one discovery signal from the first cell is associated with different resource elements of said set of sub frames to those associated with the at least one discovery signal from the second cell,
wherein each respective one of the first cell and the second cell is associated with a respective cell identity,
wherein a timing for a number of positions of the at least one discovery signal from the first cell in said set of sub frames is dependent on said respective cell identity,
wherein the timing for the number of positions of the discovery signal is based on a modulo operation performed with respect to said first cell identity, and
wherein a period for transmitting the at least one discovery signal from the first cell is aligned with a period for transmitting the at least one discovery signal from the neighboring second cell.

3. A method as claimed in claim 2, wherein the at least one discovery signal of said first cell is provided in a sub frame of said set of sub frames, and is provided on different resource elements of said set of sub frames to those used by the second cell.

4. A method as claimed in claim 1, wherein each at least one discovery signal comprises a synchronization signal.

5. A method as claimed in claim 1, wherein said set of sub frames comprises empty or blank subframes with no data to transmit causing a transmitter associated with the network node to be shut down during those empty or blank subframes to save energy.

6. A method as claimed in claim 5, wherein said set of sub frames are repeated x times to provide a burst, x being an integer.

7. A non-transitory computer program product comprising computer-executable computer program code which when run on a communication device is configured to cause the communication device to perform the method of claim 1.

8. An apparatus comprising:
   at least one non-transitory memory comprising computer code; and
   at least one processor, the at least one memory and the computer code configured, with the at least one processor, to cause the apparatus to perform at least:
   receive at least one discovery signal from a first cell in a less active state than another cell and receiving at least one discovery signal from the second cell in a less active state than the another cell within different sub frames of a set of sub frames, said set of sub frames comprising a plurality of consecutive sub frames, said second cell neighboring said first cell,
   wherein a first sub frame in which the at least one discovery signal received from the first cell depends on a first cell identifier of the first cell, and a second sub frame in which the at least one discovery signal received from the second cell depends on a second cell identifier of the second cell,
   wherein the at least one discovery signal from the first cell is associated with different resource elements of said set of sub frames to those associated with the at least one discovery signal from the second cell,
   wherein each respective one of the first cell and the second cell is associated with a respective cell identity; and
   derive a number of positions of the at least one discovery signal from the one of the first cell and the second cell based on said respective cell identity,
   wherein a timing for the number of positions of the discovery signal is dependent on a modulo operation performed with respect to said respective cell identity, and
   wherein a period for receiving the at least one discovery signal from the first cell is aligned with a period for receiving the at least one discovery signal from the neighboring second cell.

9. An apparatus comprising:
   at least one non-transitory memory comprising computer code; and
   at least one processor,
   causing the apparatus at least to:
   transmit at least one discovery signal from a first cell, said first cell being in a less active state than another cell,
   wherein the at least one discovery signal is transmitted within a first sub frame that is different from a second sub frame used for transmitting at least one discovery signal by a second cell, a set of sub frames comprising the first sub fame and the second sub frame, said set of sub frames comprising a plurality of consecutive sub frames, said second cell neighboring said first cell, and said second cell being in a less active state than the another cell,
   wherein the first sub frame in which the at least one discovery signal transmitted from the first cell depends on a first cell identifier of the first cell, and the second sub frame in which the at least one discovery signal transmitted from the second cell depends on a second cell identifier of the second cell,
   wherein the at least one discovery signal from the first cell is associated with different resource elements of said set of sub frames to those associated with the at least one discovery signal from the second cell,
   wherein each respective one of the first cell and the second cell is associated with a respective cell identity,
   wherein a number of positions of the at least one discovery signal from the first cell being dependent on said respective cell identity,
   wherein the number of positions is derived based on a modulo operation performed with respect to said first cell identity,
   wherein the timing for the number of positions of the discovery signal is based on a modulo operation performed with respect to said first cell identity, and
   wherein a period for transmitting the at least one discovery signal from the first cell is aligned with a period for transmitting the at least one discovery signal from the neighboring second cell.

10. Apparatus as claimed in claim 8, wherein said set of sub frames comprises empty or blank subframes with no data to transmit to causing a transmitter associated with the network node to be shut down during those empty or blank subframes to save energy.

11. Apparatus as claimed in claim 10, wherein said set of sub frames are repeated x times to provide a burst, x being an integer.

12. A computer program product, stored on a non-transitory computer readable medium, comprising computer-executable computer program code which when run on a communication device is configured to cause the communication device to perform the method of claim 2.

13. The method as claimed in claim 1, wherein the position of the at least one discovery signal is derived from an index of more than one unique orthogonal positions based on a modulo calculated using a physical cell identification of the communication device and a number of the unique orthogonal positions.

14. The method as claimed in claim 13, wherein the more than one unique orthogonal positions comprises twenty positions, and wherein the position of the at least one discovery signal in the index is given by physical cell identification modulo 20.

15. The method as claimed in claim 1, wherein the at least one discovery signal comprises a common discovery signal, a primary synchronization signal, and a secondary synchronization signal repeated y times in every Nth sub frame, where y and N are integers.

16. The method as claimed in claim 15, wherein the modulo operation binds a physical cell identity of the cell to the number of positions of the at least one discovery signal to identify discovery signals associated with the cell.

* * * * *